US009667341B2

(12) United States Patent
Youn et al.

(10) Patent No.: US 9,667,341 B2
(45) Date of Patent: May 30, 2017

(54) APPARATUS AND METHOD FOR PROTECTION SWITCHING IN OPTICAL TRANSPORT NETWORK (OTN) SUPORTING ODUFLEX(GFP)

(71) Applicant: ELECTRONICS AND TELECOMMUNICATIONS RESEARCH INSTITUTE, Daejeon-si (KR)

(72) Inventors: Ji Wook Youn, Daejeon-si (KR); Je Soo Ko, Daejeon-si (KR); Seung Woo Lee, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 90 days.

(21) Appl. No.: 14/801,147

(22) Filed: Jul. 16, 2015

(65) Prior Publication Data

US 2016/0020850 A1    Jan. 21, 2016

(30) Foreign Application Priority Data

Jul. 16, 2014 (KR) ........................ 10-2014-0090026

(51) Int. Cl.
*G02F 1/00* (2006.01)
*H04B 10/032* (2013.01)
(Continued)

(52) U.S. Cl.
CPC ............ *H04B 10/032* (2013.01); *H04J 3/085* (2013.01); *H04J 3/1652* (2013.01); *H04J 2203/006* (2013.01)

(58) Field of Classification Search
CPC ...... H04B 10/032; H04J 3/085; H04J 3/1652; H04J 2203/006
(Continued)

(56) References Cited

U.S. PATENT DOCUMENTS 8,699,524 B2 * 4/2014 Youn ..................... H04J 3/1658
370/474
8,886,040 B2 * 11/2014 Vissers ................. H04J 3/1658
370/470

(Continued)

FOREIGN PATENT DOCUMENTS

KR    1020100116961 A    11/2010
KR    1020140031648 A    3/2014

OTHER PUBLICATIONS

Fang, "A Novel Scheme for Realization of Flexible ODU Hitless Resizing," 2010 Symposium on Photonics and Optoelectronic (SOPO), Jun. 19-21, 2010, pp. 1-4.*

(Continued)

*Primary Examiner* — Juan A Torres
(74) *Attorney, Agent, or Firm* — Ladas & Parry LLP (57) ABSTRACT

An apparatus for protection switching in an optical transport network (OTN) includes: a working path interface module configured to check, via a working path for protection switching, connectivity of a first end node and a corresponding second end node; and a protecting path interface module configured to check connectivity of the first end node and the second node via a protection path for protection switching. Upon confirming the connectivity, the working path interface module and the protection path interface module exchange bandwidth resize (BWR) coordination information with each other and simultaneously output an ODUflex bandwidth control signal based on the exchanged BWR coordination information.

17 Claims, 5 Drawing Sheets

(51) Int. Cl.
*H04J 3/16* (2006.01)
*H04J 3/08* (2006.01)

(58) Field of Classification Search
USPC .............................................. 398/5
See application file for complete search history.

(56) References Cited

U.S. PATENT DOCUMENTS

| | | | |
|---|---|---|---|
| 2007/0292129 A1 | 12/2007 | Yan et al. | |
| 2012/0170936 A1* | 7/2012 | Vissers ................ | H04J 3/1658 398/58 |
| 2012/0281983 A1* | 11/2012 | Youn .................... | H04J 3/1658 398/45 |
| 2013/0243417 A1 | 9/2013 | Youn et al. | |
| 2014/0050470 A1* | 2/2014 | Youn ................... | H04B 10/032 398/1 |
| 2014/0086581 A1* | 3/2014 | Youn ....................... | H04B 1/74 398/45 |
| 2016/0028474 A1* | 1/2016 | Rahn ....................... | H04J 3/14 398/5 |

OTHER PUBLICATIONS

ITU-T, G.7044 Series G: Transmission Systems and Media, Digital Systems and Networks Data over Transport—Generic aspects—General Series Y: Global Information Infrastructure, Internet Protocol Aspects and Next-Generation Networks Internet protocol aspects—Transport Hitless adjustment of ODUflex(GFP), Oct. 2011, pp. 1-36.*

* cited by examiner

FIG. 1

--- Prior Art ---

FIG. 2

-- Prior Art --

APPARATUS AND METHOD FOR PROTECTION SWITCHING IN OPTICAL TRANSPORT NETWORK (OTN) SUPORTING ODUFLEX(GFP)

CROSS-REFERENCE TO RELATED APPLICATION(S)

This application claims priority from Korean Patent Application No. 10-2014-0090026, filed on Jul. 16, 2014, in the Korean Intellectual Property Office, the disclosure of which is incorporated herein by reference in its entirety.

BACKGROUND

1. Field

The following description relates to an optical transport network (OTN), and more particularly, to a technology for protection switching in the OTN.

2. Description of the Related Art

An optical transport network supports a wide bandwidth, high reliability, well-developed protection switching function, and operations administration and management (OAM) technologies. Accordingly, research on transmission of packet data, which shows a remarkable growth, through an optical transport network has been actively conducted, and the relevant standardization is in progress under the auspices of the International Telecommunication Union Telecommunication standardization sector (ITU-T). In particular, ITU-T SG 15 has standardized a flexible optical channel data unit (hereinafter, referred to as "ODUflex") that can receive Ethernet data more efficiently through an OTN, as well as has developed a hitless adjustment of ODUflex(GFP) (HAO) protocol and released G.7044 standard for HAO, which allows for increase or decrease of a size of an ODUflex(GFP) signal (i.e., bandwidth resizing operation) without affecting a service that is being operated in the network. In an OTN that is operated in (1+1) form, when an ODUflex signal on a working path is increased or decreased, the ODUflex signal on a corresponding protection path should also be increased or decreased simultaneously. In the actual network, however, the working path and the protection path are configured differently, and thus the working path and the protection path have different latencies from each other. According to the present ITU-T G.7044 standard, in the process of executing a HAO protocol, a bandwidth of an ODUflex signal is increased or decreased immediately upon a value of a network connectivity status (hereinafter, referred to as "NCS") signal being set to ACK in response to a tributary slot connectivity check (hereinafter, referred to as "TSCC") signal, without the consideration of the latencies of a working path and a protection path. Therefore, the use of a HAO protocol defined in the current G.7044 standard may cause data loss due to a difference in latency between the working path and the protection path, at the time of increasing or decreasing the bandwidth of an ODUflex signal.

In Korean Patent Publication No. 10-2014-0031648, protection switching in an optical transport network is disclosed, which only determines a communication failure of an individual optical line terminal (OLT) and does not take into account timing delays.

SUMMARY

The following description relates to an apparatus and method for protection switching in an optical transport network, which adjust a starting time of increasing or decreasing a flexible optical channel data unit (ODUflex) signal, taking into consideration a difference in latency between a working path and a protection path, in the process of executing a hitless adjustment of ODUflex(GFP) (HAO) protocol, thereby preventing data loss due to the difference in latency between the working path and the protection path.

In one general aspect, there is provided an apparatus for protection switching which is included in a first end node in an optical transport network (OTN) that supports both protecting switching and a flexible optical channel data unit (ODUflex(GFP)) signal, the apparatus including: a working path interface module configured to check, via the working path for protection switching, connectivity with a second end node that corresponds to the first end node; and a protecting path interface module configured to check connectivity with the second node via the protection path for protection switching, wherein upon confirming the connectivity, the working path interface module and the protection path interface module exchange bandwidth resize (BWR) coordination information with each other and simultaneously output an ODUflex bandwidth control signal based on the exchanged BWR coordination information.

The working path interface module and the protection path interface module may send a network connectivity status (NCS) signal to the second end node via the working path and the protection path, respectively, and each may check the connectivity of the first end node and the second end node by receiving an NCS signal that has been set to ACK as an acknowledgement signal from the second end node.

The working path interface module and the protection path interface module may perform a bandwidth resizing operation by outputting an ODUflex bandwidth control signal using a hitless adjustment of ODUflex(GFP) protocol that allows for increase or decrease of a size of a signal. The HAO protocol may allow for hitless increase or decrease of a size of an ODUflex(GFP) signal in the process of resizing a bandwidth, without affecting services that are being operated in the OTN.

The working path interface module may change a value of the BWR coordination information to true once confirming the connectivity with the second end node, then transmit the BWR coordination information to the protection path interface module, and when receiving BWR coordination information from the protection path interface module, check whether a value of the received BWR coordination information is true or not, and, if the value is true, output the ODUflex bandwidth control signal. In addition, the protection path interface module may change a value of the BWR coordination information to true once confirming the connectivity with the second end node; then transmit the BWR coordination information to the working path interface module; then, when receiving BWR coordination information from the working path interface module, check whether a value of the received BWR coordination information is true or not; and, if the value is true, output the ODUflex bandwidth control signal.

In another general aspect, there is provided a method for protection switching in an OTN, which is performed by an apparatus for protection switching that supports an ODUflex (GFP) signal, the method including: checking, via both a working path and a protection path for protection switching, connectivity of a first end node and a corresponding second end node; once the connectivity with the second end node is checked via the working path and via the protection path, exchanging BWR coordination information between a working path interface module and a protection path interface module; and outputting, at both the working path interface module and the protection path interface module, an ODUflex bandwidth control signal based on the exchanged BWR coordination information.

The checking of the connectivity of the first end node and the second end node may include sending an NCS signal from the working path interface module to the second end node via the working path, receiving an NCS signal that has been set to ACK from the second end node via the working path, sending an NCS signal from the protection path interface module to the second end node via the protection path, and receiving an NCS signal that has been set to ACK from the second end node via the protection path.

In the simultaneous outputting of the ODUflex bandwidth control signal, a bandwidth resizing operation may be performed by outputting the ODUflex bandwidth control signal using a HAO protocol that allows for increase or decrease of a size of a signal. The HAO protocol may allow for hitless increase or decrease of a size of an ODUflex(GFP) signal in the process of resizing a bandwidth, without affecting services that are being operated in the OTN.

In the exchanging of the BWR coordination information between the working path interface module and the protection path interface module, the working path interface module may change a value of the BWR coordination information to true once confirming the connectivity with the second end node; then transmit the BWR coordination information to the protection path interface module; then, when receiving BWR coordination information from the protection path interface module, check whether a value of the received BWR coordination information is true or not; and, if the value is true, output the ODUflex bandwidth control signal.

In the exchanging of the BWR coordination information between the working path interface module and the protection path interface module, the protection path interface module may change a value of the BWR coordination information to true once confirming the connectivity with the second end node; then transmit the BWR coordination information to the working path interface module; then, when receiving BWR coordination information from the working path interface module, check whether a value of the received BWR coordination information is true or not; and, if the value is true, output the ODUflex bandwidth control signal.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The exemplary embodiments described herein relate to supporting protection switching on an optical transport network (OTN) that support ODUflex(GFP) signals defined by International Telecommunication Union Telecommunication standardization sector (ITU-T). Protection switching is one of mechanisms for quickly restoring communication between nodes when a fault occurs in a network. For protection switching, a protection path of a specific bandwidth is set between nodes in advance, in addition to a working path. Thus, when communication via the working path is impossible due to a fault in the network, communication between nodes is restored through the protection path.

The ITU-T G.7044 standard defines procedures of resizing a network connection, which do not lead to packet loss on a network that supports a ODUflex(GFP) signal. The procedure is referred to as a hitless adjustment of ODUflex (GFP) (HAO) protocol. According to the ITU-T G.7044 standard, the HAO protocol includes link connection resize (LCR) protocol and a bandwidth resize (BWR) protocol (Hereinafter, 'the network connection resize' indicates both the LCR protocol and the BWR protocol). Thus, in order to complete the network connection resize procedures, it is needed to perform procedures according to the LCR protocol and the BWR protocol separately. In addition, various kinds of information required for executing both the LCR protocol and the BWR protocol are included in resize control overhead (RCOH) and then transferred.

Figure 1:
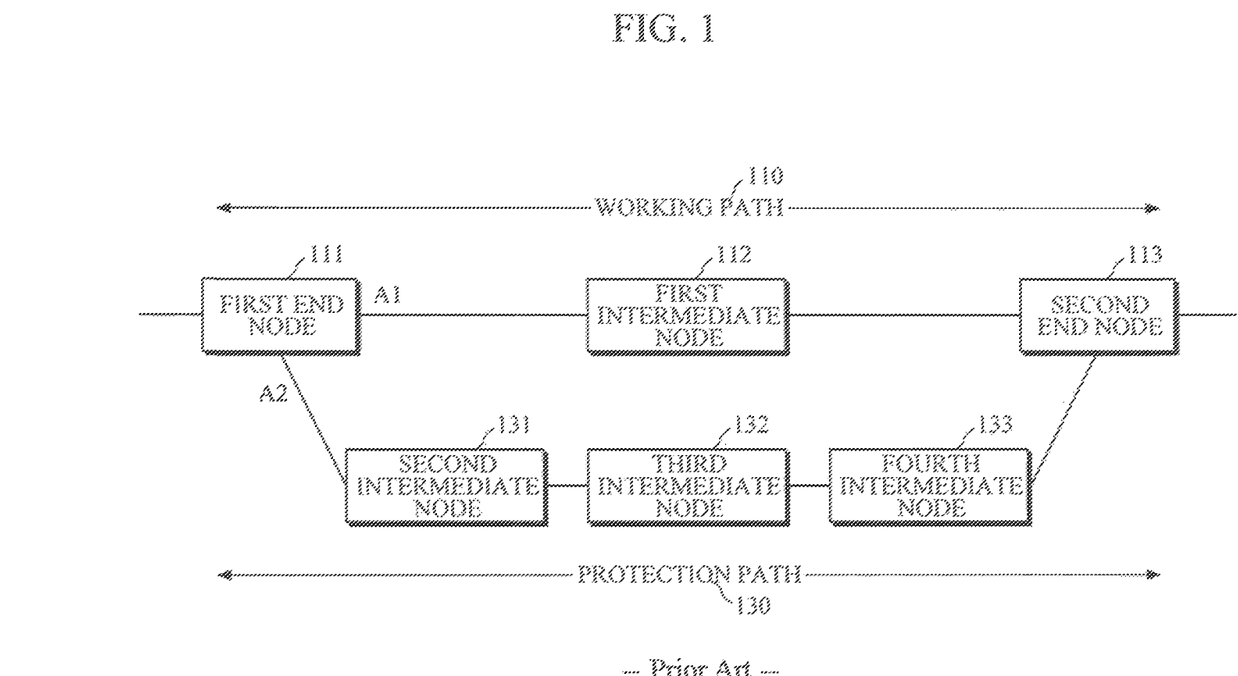
FIG. 1 is a diagram illustrating a network structure for protection switching in an optical transport network (OTN) that supports flexible optical channel data unit (ODUflex) signals.

FIG. 1 is a diagram illustrating a network structure for protection switching in an optical transport network (OTN) that supports ODUflex signals.

Referring to FIG. 1, the OTN that supports an ODUflex signal includes a working path 110 and a protection path 130. In one exemplary embodiment, the working path 110 may consist of a first end node 111, a second end node 113, and a first intermediate node 112 for transmission of an ODUflex signal. The protection path 130 may consist of the first end node 111, the second end node 113, a second intermediate node 131, a third intermediate node 132, and a fourth intermediate node 133. In an actual OTN, the working path 110 and the protection path 130 include different number of intermediate nodes, and each intermediate node has a different latency. In the case of signal transmission through the working path 112, the signal is sent from the first end node 111 to the second end node 113 via the first intermediate node 112, whereas in the case of signal transmission through the protection path 130, the signal is sent from the first end node 111 to the second end node 113 via the second, third and fourth intermediate nodes 131, 132, and 133. Therefore, there is a difference in transmission time between the working path 110 and the protection path 130.

Thus, according to the present exemplary embodiment, the first end node 111 has two network interfaces A1 and A2. A working path interface A1 provides an interface to nodes on the working path 110, a protection path interface A2 provides an interface to nodes on the protection path 130.

Figure 2:
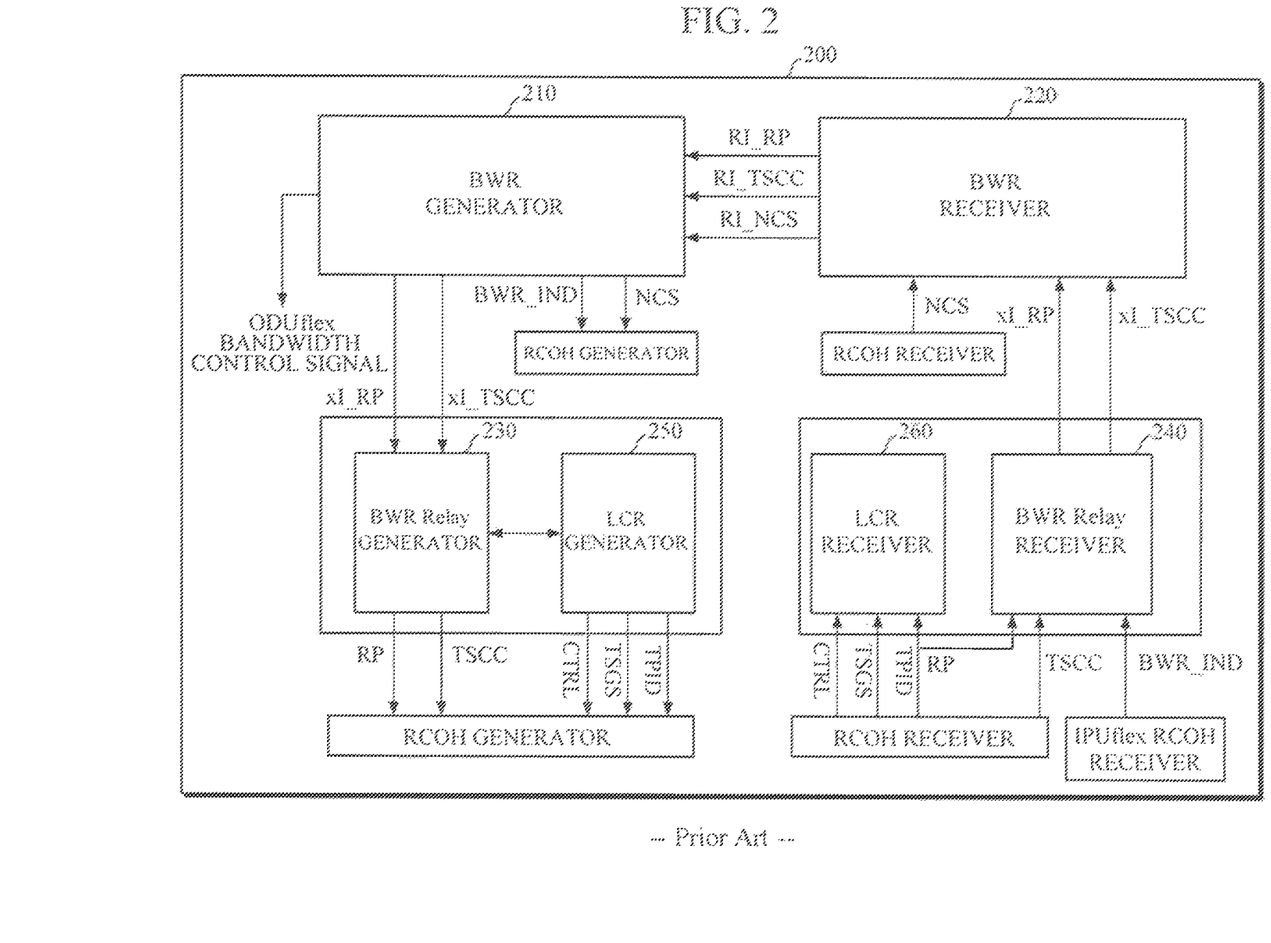
FIG. 2 is a diagram illustrating a configuration of a working path interface module of an ODUflex(GFP) end node that is defined in ITU-T standards.

FIG. 2 is a diagram illustrating a configuration of a working path interface module of an ODUflex(GFP) end node that is defined in ITU-T standards.

Referring to FIG. 1 and FIG. 2, the working path interface module 200 of the first end node 111 may include largely a BWR generator 210, a BWR receiver 220, a BWR relay generator 230, a BWR relay receiver 240, an LCR generator 250, and an LCR receiver 260. Functions and operations of each block are the same as those defined in the G.7044 standard, and thus detailed descriptions thereof will be omitted. A BWR protocol and an LCR protocol uses a hitless adjustment of ODUflex(GFP) (HAO) protocol that allows for hitless increase or decrease of the size of an ODUflex (GFP) signal without affecting services operated in an optical transport network (OTN).

Each of the first end node 111 and the second end node 113 includes the working path interface A1 and the protection path interface A2. The configuration of the working path interface module 200 as shown in FIG. 2 is applied to each of the working path interface A1 and the protection path interface A2. In other words, the protection path interface A2 includes a protection path interface module that has the same configuration as that of the working path interface module 200, other than it is operated on the protection path. This is because, when an increase or decrease of a bandwidth of an ODUflex(GFP) signal is required, HAO protocol defined in G.7044 standard should be executed separately for each of the working path 110 and the protection path 130.

When the working path interface module 200 receives an ODUflex(GFP) increase or decrease command from a network management system (NMS), the BWR generator 210 generates a bandwidth resize indicator (BWR_IND) signal, a network connectivity status (NCS) signal, a resizing protocol indicator (RP) signal, and a tributary slot connectivity check (TSCC) signal, and the LCR generator 250 generates a control (CTRL) signal, a tributary slot group status (TSGS) signal, and a tributary port ID (TPID) signal. After executing the LCR protocol, the BWR protocol is executed. In the process of executing the BWR protocol, the NCS signal is used to check connectivity of the ODUflex(GFP) end nodes 111 and 113. Specifically, in response to receiving RP=1 signal and TSCC=1 signal, each of the end nodes 111 and 113 sets the NCS signal to ACK and send the NCS signal to the correspondent node. When at each end node 111 and 113, the BWR generator 210 sends RP=1 signal and TSCC=1 signal and the BWR receiver 220 receives NCS=ACK signal, it is determined that the connectivity of the ODUflex (GFP) end nodes 111 and 113 has been checked, and then an ODUflex bandwidth control signal is output, so that the ODUflex bandwidth can be increased or decreased. At this time, a signal input to the first end node 111 is actually mapped to the ODUflex, and the same signal is mapped to the working path 110 and the protection path 130. Therefore, the ODUflex(GFP) bandwidths carried through both the working path interface A1 and the protection path interface A2 are simultaneously increased or decreased.

However, in the actual OTN, the working path 110 and the protection path 130 have a different transmission delay time from each other, and thus NCS=ACK signals sent to the first end node 111 through the working path interface A1 and the protection path interface A2 arrive at different times. In this case, a path with a longer transmission delay time starts increasing or decreasing a bandwidth of the input signal that is to be mapped to the ODUflex, without having received NCS=ACK signal. Thus, before the path is ready to map the input signal to ODUflex (i.e. before receiving NCS=ACK signal), the bandwidth of the input signal is changed, and hence data loss occurs.

Figure 3:
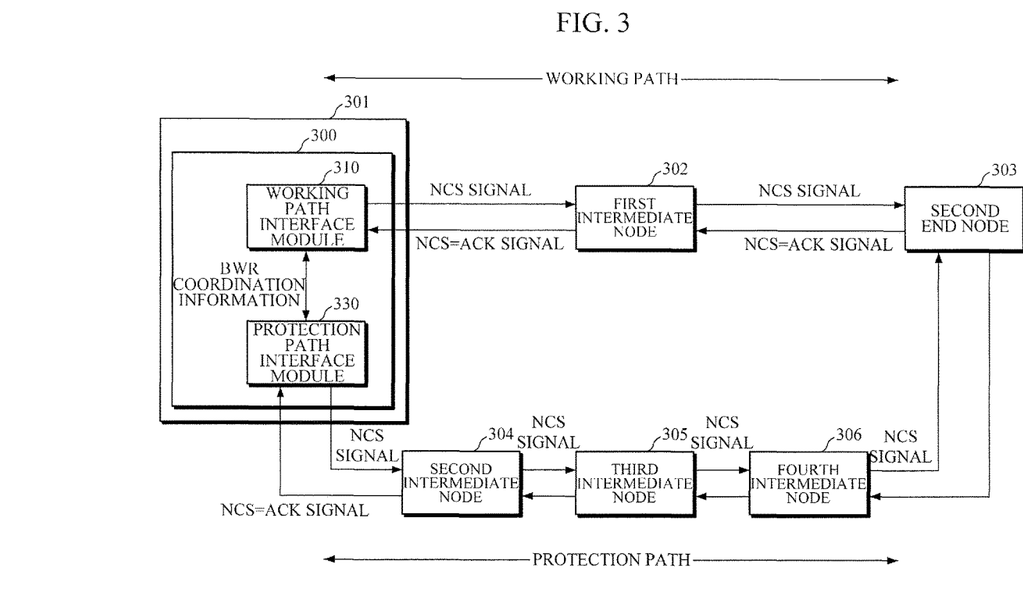
FIG. 3 is a diagram illustrating a configuration of an apparatus for protection switching in an OTN according to an exemplary embodiment of the present invention.

FIG. 3 is a diagram illustrating a configuration of an apparatus for protection switching in an OTN according to an exemplary embodiment of the present invention.

Referring to FIG. 3, the apparatus 300 for protection switching in an OTN is located at each of a first end node 301 and a second end node 303 of the OTN, sends and receives signals through a working path interface module 310 over a working path, and sends and receives signals through a protection path interface module 330 over a protection path 130. The working path interface module 310 is a communication interface that sends and receives signals via the working path in the OTN. The working path may include first end node 301, first intermediate node 302, and second end node 303. The protection path interface module 330 is a communication interface that sends and receives signals via the protection path. The protection path may include first end node 301, second intermediate node 304, third intermediate node 305, fourth intermediate node 306, and second node 303.

When receiving an ODUflex(GFP) bandwidth increase/decrease command from a network management system (NMS), the apparatus 300 executes HAO protocol according to the G.7044 standard. At this time, the HAO protocol is executed independently in each of the working path interface module 310 and the protection path interface module 330. The LCR protocol is the same as the LCR protocols of FIG. 1 and FIG. 2. The BWR protocol uses an NCS signal to check connectivity of the two end nodes 301 and 303. Specifically, the second end node 303 sets an NCS signal to ACK (NCS=ACK) and sends it to the first end node 301. In a related art, after the connectivity of ODUflex(GFP) end nodes is checked by receiving NCS=ACK signal, then increase or decrease of the bandwidth of an ODUflex(GFP) signal is immediately started. Whereas, according to the present exemplary embodiment, the apparatus 300 receives NCS signal (NCS=ACK) that has been set to ACK and checks the connectivity of the ODUflex(GFP) end nodes, and then the apparatus 300 outputs an ODUflex bandwidth control signal based on BWR coordination information that is received via a correspondent path interface, and starts increasing or decreasing the bandwidth of an ODUflex(GFP) signal, rather than immediately starting the bandwidth adjustment. Here, the correspondent path interface refers to a path interface that corresponds to the path interface currently used. In the case of the working path interface module 310, the correspondent path interface is the protection path interface module 330, whereas the correspondent path interface of protection path interface module 330 is the working path interface module 310.

For example, if each of the working path interface module 310 and the protection path interface module 330 of the first end node 301 receives a normal NCS=ACK signal in the course of BWR protocol execution, they change the value of BWR coordination information to true and output the information to the correspondent path interface to notify that the path interface itself is ready to increase or decrease the bandwidth of an ODUflex signal.

Figure 4:
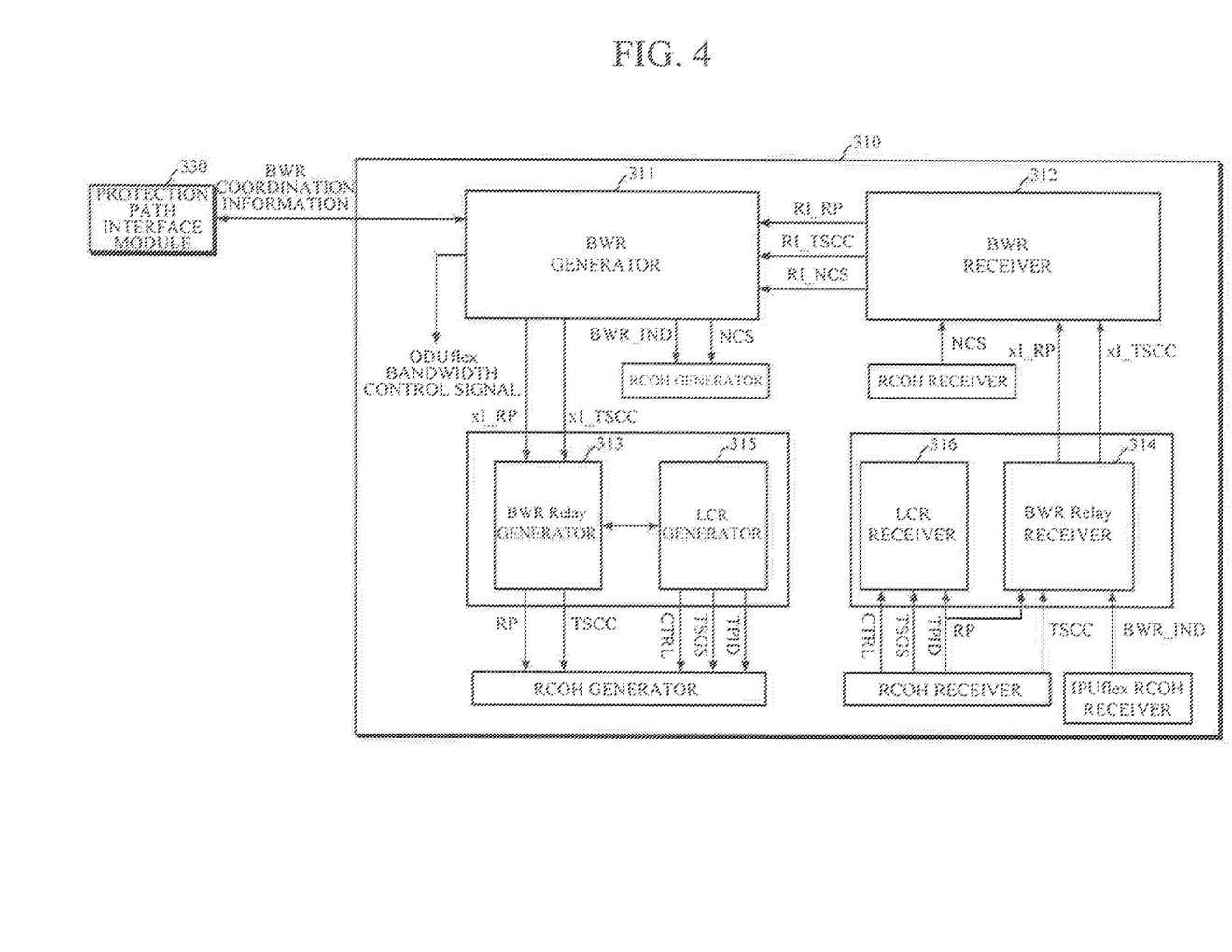
FIG. 4 is a diagram illustrating in detail the working path interface module of the apparatus according to the exemplary embodiment in FIG. 3.

FIG. 4 is a diagram illustrating in detail the working path interface module of the apparatus according to the exemplary embodiment in FIG. 3.

Referring to FIGS. 3 and 4, the working path interface module 310 of the apparatus 300 for protection switching in an OTN includes a BWR generator 311, a BWR receiver 312, a BWR relay generator 313, a BWR relay receiver 314, an LCR generator 315, and an LCR receiver 316. The BWR receiver 312, the BWR relay generator 313, the BWR relay receiver 314, the LCR generator 315, and the LCR receiver 316 perform the same operations and functions as those of corresponding elements in FIG. 2. For bandwidth resize, HAO protocol is used, which allows for hitless increase or decrease of the size of ODUflex (GFP) signal without affecting services operated in the network.

When receiving an ODUflex(GFP) increase or decrease command from the NMS, the BWR generator 311 generates a BWR_IND signal, an NCS signal, an RP signal and a TSCC signal, and the LCR generator 315 generates a CTRL signal, a TSGS signal, and a TPID signal. Then, after the execution of LCR protocol, the BWR protocol is executed. In the course of executing the BWR protocol, the NCS signal is used to check connectivity of the ODUflex(GFP) end nodes. Specifically, in response to receiving RP=1 signal and TSCC=1 signal, the end node sets the NCS signal as to ACK and sends it to the correspondent end node. When the BWR generator 311 sends RP=signal and TSCC=1 signal and the BWR receiver 312 receives NCS=ACK signal, it is determined that the connectivity of the ODUflex(GFP) end nodes has been checked. Upon determining that the connectivity of ODUflex(GFP) end nodes has been checked, the BWR generator 311 changes the value of BWR coordination information to true and transmits the information to the protection path interface module 330 to inform that the working path interface module 310 is ready to increase or decrease the bandwidth of an ODUflex signal.

Upon determining that the connectivity of the end nodes has been checked through the same procedures that are performed by the working path interface module 310, the protection path interface module 330 changes the value of BWR coordination information to true and transmits the information to the working path interface module 310 to inform that the protection path interface module 330 is ready to increase or decrease the bandwidth of an ODUflex signal. By exchanging the BWR coordination information, the working path interface module 310 and the protection path interface module 330 conform that their correspondent path interface is ready to increase or decrease the bandwidth of an ODUflex signal. Then, the working path interface module 310 and the protection path interface module 330 each output the ODUflex bandwidth control signal to start increasing or decreasing the bandwidth of an ODUflex signal. By doing so, the working path interface module 310 and the protection path interface module 330 are able to simultaneously start increasing or decreasing the bandwidth of an ODUflex(GFP) by outputting the ODUflex bandwidth control signal at the same time, regardless of their different latencies.

Figure 5:
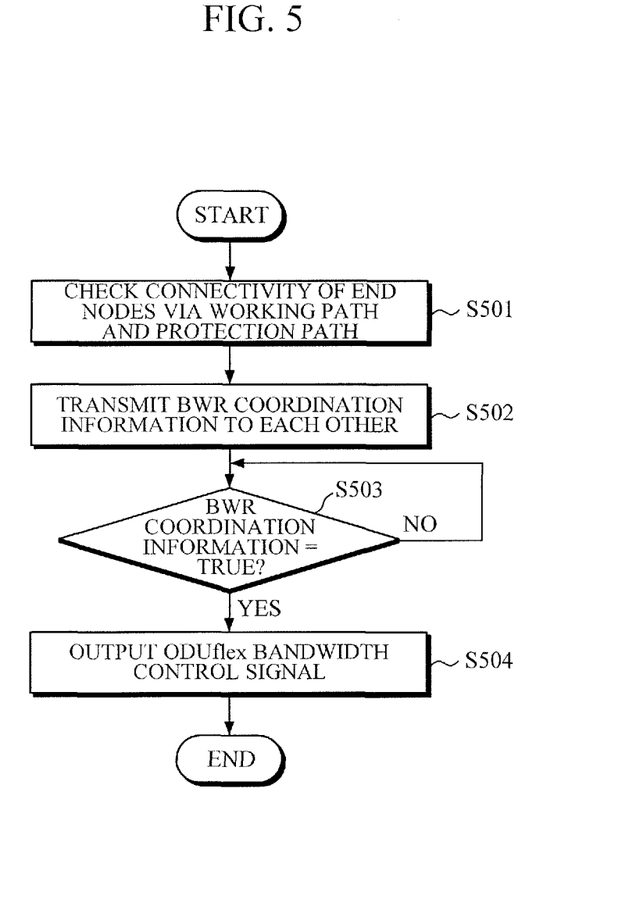
FIG. 5 is a flowchart illustrating a method for protection switching in an OTN according to an exemplary embodiment of the present invention.

FIG. 5 is a flowchart illustrating a method for protection switching in an OTN according to an exemplary embodiment of the present invention.

Referring to FIG. 5, in the method for protection switching in an OTN, connectivity of end nodes via a working path and via a protection path in the OTN is checked, as depicted in S501. In response to receiving an ODUflex(GFP) bandwidth increase or decrease command from the NMS, a HAO protocol is executed according to the G.7044 standard. The HAO protocol is executed independently on each of the working path and the protection path. A BWR protocol uses an NCS signal to check connectivity of two end nodes.

When receiving an ODUflex(GFP) increase or decrease command from the NMS, an apparatus for protection switching generates a BWR_IND signal, an NCS signal, an RP signal, a TSCC signal, a CTRL signal, a TSGS signal, and a TPID signal. After execution of an LCR protocol, the BWR protocol is executed. In the course of executing the BWR protocol, an NCS signal is used to check the connectivity of the ODUflex(GFP) end nodes.

One end node sends NCS signals to the correspondent end node via each of a working path interface module and a protection path interface module in order to check the connectivity status, and the correspondent end node sets the received NCS signal to ACK (NCS=ACK) and sends the resulting signal to the opposite end node via each of a working path interface module and a protection path interface module. The apparatus for protection switching receives NCS=ACK signal through the working path interface module and the protection path interface module and confirms the connectivity. Specifically, in response to receiving RP=1 signal and TSCC=1 signal, the end node sets the NCS signal to ACK (NCS=ACK) and sends the resulting NCS signal. When each end node sends RP=1 signal and TSCC=1 signal and receives NCS=ACK signal, the apparatus for protection switching is able to determine that the connectivity of the two ODUflex(GFP) end nodes has been checked.

When the connectivity via the working path and via the protection path has been checked, the working path interface module and the protection path interface module transmit BWR coordination information to each other, as depicted in S502. Upon checking the connectivity by receiving NCS=ACK signal, the working path interface module and the protection path interface module change the value of BWR coordination information to true and send it to each other.

The working path interface module and the protection path interface module check the received BWR coordination information, as depicted in S503. The working path interface module and the protection path interface module check the BWR coordination information to confirm whether the value of the information is true or not. If the value of BWR coordination information received by each of the working path interface module and the protection path interface module is true, it is determined that both the working path interface module and the protection path interface module is ready to increase or decrease the bandwidth. Thus, each of the working path interface module and the protection path interface module outputs an ODUflex bandwidth control signal to start increasing or decreasing the bandwidth of an ODUflex(GFP) signal, as depicted in S504. In contrast, if either or both of the values of BWR coordination information received by the working path interface module and the protection path interface module are false, it is determined that the path interface with the value of false has not been ready to perform a bandwidth resizing operation, and thus the determined path interface is in standby until it receive another BWR coordination information.

As described above, according to the apparatus and method for protection switching in an OTN, BWR coordination information transmitted between the working path and the protection path is applied to functional blocks of an end node for ODUflex(GFP) signal transmission, which is defined in the ITU-T standard G.7044, and thereby data loss due to a transmission delay difference between the working path and the protection path can be prevented when the bandwidth of an ODUflex signal is hitlessly increased or decreased in the process of operating the network.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus connected to a source of packet data for protection switching which is included in a first end node in an optical transport network (OTN) that supports both protecting switching and a flexible optical channel data unit (ODUflex(GFP)) signal, the apparatus comprising:
a working path interface module configured to check, via the working path for protection switching, connectivity with a second end node that corresponds to the first end node; and
a protecting path interface module configured to check connectivity with the second node via the protection path for protection switching,
wherein upon confirming the connectivity, the working path interface module and the protection path interface module exchange bandwidth resize (BWR) coordination information with each other and simultaneously output an ODUflex bandwidth control signal based on the exchanged BWR coordination information.

2. The apparatus of claim 1, wherein the working path interface module and the protection path interface module send a network connectivity status (NCS) signal to the second end node via the working path and the protection path, respectively, and each checks the connectivity of the first end node and the second end node by receiving an NCS signal that has been set to ACK as an acknowledgement signal from the second end node.

3. The apparatus of claim 1, wherein the working path interface module and the protection path interface module perform a bandwidth resizing operation by outputting an ODUflex bandwidth control signal using a hitless adjustment of ODUflex(GFP) (HAO) protocol that allows for increase or decrease of a size of a signal.

4. The apparatus of claim 1, wherein the working path interface module changes a value of the BWR coordination information to true once confirming the connectivity with the second end node, then transmits the BWR coordination information to the protection path interface module, and when receiving BWR coordination information from the protection path interface module, checks whether a value of the received BWR coordination information is true or not, and, if the value is true, outputs the ODUflex bandwidth control signal.

5. The apparatus of claim 1, wherein the protection path interface module changes a value of the BWR coordination information to true once confirming the connectivity with the second end node; then transmits the BWR coordination information to the working path interface module; then, when receiving BWR coordination information from the working path interface module, checks whether a value of the received BWR coordination information is true or not; and, if the value is true, outputs the ODUflex bandwidth control signal.

6. The apparatus of claim 3, wherein the HAO protocol allows for hitless increase or decrease of a size of an ODUflex(GFP) signal in the process of resizing a bandwidth, without affecting services that are being operated in the OTN.

7. A method for protection switching in an optical transport network (OTN) connected to a source of packet data, which is performed by an apparatus for protection switching that supports an ODUflex(GFP) signal, the method comprising:
checking, by the apparatus for protection switching, via both a working path and a protection path for protection switching, connectivity of a first end node and a corresponding second end node;
once the connectivity with the second end node is checked via the working path and via the protection path, exchanging, by the apparatus for protection switching bandwidth resize (BWR) coordination information between a working path interface module and a protection path interface module; and
outputting, by the apparatus for protection switching, at both the working path interface module and the protection path interface module, an ODUflex bandwidth control signal based on the exchanged BWR coordination information.

8. The method of claim 7, wherein the checking of the connectivity of the first end node and the second end node comprises:
sending a network connectivity status (NCS) signal from the working path interface module to the second end node via the working path,
receiving an NCS signal that has been set to ACK from the second end node via the working path,
sending an NCS signal from the protection path interface module to the second end node via the protection path, and
receiving an NCS signal that has been set to ACK from the second end node via the protection path.

9. The method of claim 7, wherein in the simultaneous outputting of the ODUflex bandwidth control signal, a bandwidth resizing operation is performed by outputting the ODUflex bandwidth control signal using a hitless adjustment of ODUflex (GFP) (HAO) protocol that allows for increase or decrease of a size of a signal.

10. The method of claim 7, wherein in the exchanging of the BWR coordination information between the working path interface module and the protection path interface module, the working path interface module changes a value of the BWR coordination information to true once confirming the connectivity with the second end node; then transmits the BWR coordination information to the protection path interface module; then, when receiving BWR coordination information from the protection path interface module, checks whether a value of the received BWR coordination information is true or not; and, if the value is true, outputs the ODUflex bandwidth control signal.

11. The method of claim 7, wherein in the exchanging of the BWR coordination information between the working path interface module and the protection path interface module, the protection path interface module changes a value of the BWR coordination information to true once confirming the connectivity with the second end node; then transmits the BWR coordination information to the working path interface module; then, when receiving BWR coordination information from the working path interface module, checks whether a value of the received BWR coordination information is true or not; and, if the value is true, outputs the ODUflex bandwidth control signal.

12. The method of claim 9, wherein the HAO protocol allows for hitless increase or decrease of a size of an ODUflex(GFP) signal in the process of resizing a bandwidth, without affecting services that are being operated in the OTN.

13. An apparatus for protection switching connected to a source of data packets which is included in a first end node in an optical transport network (OTN) that supports both protecting switching and a flexible optical channel data unit (ODUflex(GFP)) signal, the apparatus comprising:
 a working path interface module configured to check, via the working path for protection switching, connectivity with a second end node that corresponds to the first end node; and
 a protecting path interface module configured to check connectivity with the second node via the protection path for protection switching,
 wherein upon confirming the connectivity, the working path interface module and the protection path interface module exchange bandwidth resize (BWR) coordination information with each other and simultaneously output an ODUflex bandwidth control signal based on the exchanged BWR coordination information,
 wherein a configuration of the working path interface module is identical to a configuration of the protecting path interface module.

14. The apparatus of claim 13, wherein the working path interface module comprises a bandwidth resize (BWR) generator, a BWR receiver, a BWR relay generator, a BWR relay receiver, a link connection resize (LCR) generator, and an LCR receiver.

15. The apparatus of claim 14, wherein when the BWR generator receives an ODUflex (GFP) increase or decrease command, the BWR generator generates a BWR identification (IND) signal, an network connectivity status (NCS) signal, an resizing protocol (RP) signal and a Tributary Slot Connectivity Check (TSCC) signal, and the LCR generator generates a control (CTRL) signal, a tributary slot group status (TSGS) signal, and a tributary port identification (TPID) signal.

16. The apparatus of claim 15, wherein upon confirming the connectivity, the BWR generator of the working path interface module changes a value of BWR coordination information of the working path interface module and transmits the changed value to the protection path interface module.

17. The apparatus of claim 15, wherein upon confirming the connectivity, a BWR generator of the protection path interface module changes a value of BWR coordination information of the protection path interface module and transmits the changed value to the working path interface module.

* * * * *